(12) United States Patent
Reile et al.

(10) Patent No.: US 6,771,034 B2
(45) Date of Patent: Aug. 3, 2004

(54) CHILDREN'S RIDE-ON VEHICLE WITH ELECTRONIC SPEED CONTROL

(75) Inventors: Peter Reile, South Wales, NY (US); Brian L. Bienz, West Seneca, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/081,934

(22) Filed: Feb. 20, 2002

(65) Prior Publication Data

US 2002/0113564 A1 Aug. 22, 2002

Related U.S. Application Data

(60) Provisional application No. 60/270,584, filed on Feb. 21, 2001.

(51) Int. Cl.[7] .................................................. H02P 5/00
(52) U.S. Cl. ........................ 318/139; 318/256; 318/282; 388/825; 388/829; 446/457; 446/460; 446/465; 446/436; 180/65.1
(58) Field of Search ................................. 318/139, 256, 318/280; 388/825, 829; 446/457, 460, 465, 436; 180/65.1

(56) References Cited

U.S. PATENT DOCUMENTS

| | | | |
|---|---|---|---|
| 1,951,505 A | 3/1934 | Dambrine | 46/48 |
| 3,764,870 A | 10/1973 | Morton et al. | 318/139 |
| 3,884,318 A | 5/1975 | Abels et al. | 180/65 R |
| 3,967,175 A | 6/1976 | Turley | 318/258 |
| 4,081,725 A | 3/1978 | Schmidt et al. | 318/139 |
| 4,158,158 A | 6/1979 | Burkett | 318/139 |
| 4,365,189 A | 12/1982 | Hawkins et al. | 318/284 |
| 4,378,855 A * | 4/1983 | Haub et al. | 180/65 R |
| 4,508,516 A * | 4/1985 | D'Andrade et al. | 446/443 |
| 4,553,947 A | 11/1985 | Weiland et al. | 446/443 |
| 4,555,451 A | 11/1985 | Harrod et al. | 429/1 |
| 4,560,022 A * | 12/1985 | Kassai | 180/65.1 |
| 4,736,648 A * | 4/1988 | Perego | 74/474 |
| 4,772,829 A | 9/1988 | Pickering et al. | 318/139 |
| 4,889,516 A | 12/1989 | Auer et al. | 446/462 |
| 5,644,114 A | 7/1997 | Neaves | 200/6 R |
| 5,694,017 A | 12/1997 | Lansberry | 318/809 |
| 5,816,352 A | 10/1998 | Hacker | 180/167 |
| 5,845,724 A | 12/1998 | Barrett | 180/65.1 |
| 5,859,509 A | 1/1999 | Bienz et al. | 318/439 |
| RE36,225 E | 6/1999 | Harris | 320/104 |
| 5,924,507 A | 7/1999 | Prather | 180/167 |
| 5,994,853 A * | 11/1999 | Ribbe | 318/16 |
| 6,105,507 A | 8/2000 | Jelf et al. | 104/53 |
| 6,120,345 A | 9/2000 | Lenihan et al. | 446/431 |
| 6,165,044 A * | 12/2000 | Lamar, Jr. | 446/427 |
| 6,179,331 B1 | 1/2001 | Jones, Jr. et al. | 280/827 |
| 6,422,330 B1 * | 7/2002 | Harris | 180/65.1 |
| 6,470,982 B2 * | 10/2002 | Sitarski et al. | 180/65.1 |

* cited by examiner

*Primary Examiner*—Rina Duda
(74) *Attorney, Agent, or Firm*—Kolisch Hartwell, P. C.

(57) ABSTRACT

A children's ride-on vehicle having an electronic speed controller adapted to regulate at least one of the timing and rate of application of a selected rotational input. The vehicle includes a body with a seat, a steering mechanism positioned for operation by a child to steer at least one of the vehicle's wheels, and a drive assembly with an actuator positioned for actuation by a child sitting on the seat to cause the driven rotation of at least one of the vehicle's wheels by a battery-powered motor assembly. In some embodiments, the drive assembly includes one or more user input devices that enable a child sitting on the seat to select at least one of the relative speed and direction of the vehicle. The drive assembly also includes an electronic speed controller that controls electronically the transmission of a selected rotational input to the vehicle's driven wheel assembly.

57 Claims, 8 Drawing Sheets

CHILDREN'S RIDE-ON VEHICLE WITH ELECTRONIC SPEED CONTROL

RELATED APPLICATION

The present application claims priority to co-pending U.S. Provisional Patent Application Serial No. 60/270,584, which was filed on Feb. 21, 2001, is entitled "Children's Ride-On Vehicle with Electronic Speed Control," and the complete disclosure of which is hereby incorporated by reference for all purposes.

FIELD OF THE INVENTION

The present invention relates generally to children's ride-on vehicles, and more particularly to children's ride-on vehicles having an electronic speed controller.

BACKGROUND OF THE INVENTION

Children's ride-on vehicles are reduced-scale vehicles that are designed for use by children. For example, children's ride-on vehicles include a seat adapted to accommodate one or more children and steering and drive assemblies that are adapted to be operated by a child sitting on the seat. One type of drive assembly that is often used in children's ride-on vehicles includes a battery-powered motor assembly that is adapted to drive one or more of the vehicle's wheels. Typically, the vehicle will include an actuator, such as a foot pedal or other user input device, which enables a child to select when power is delivered to the motor assembly. Some drive assemblies further include other user input devices, such as a speed selector and a direction selector, which are operated by a child sitting on the vehicle's seat to select the speed and direction at which the vehicle travels.

It is possible for a children's ride-on vehicle to tip or be damaged when the vehicle experiences sudden changes in speed, and especially when this change in acceleration is accompanied by a change in direction. Under a rapid change in speed or direction, the inertial forces of the vehicle have to be overcome. These forces may cause the vehicle to tip, especially if the vehicle is on an uneven surface, such as an incline. The vehicle's drive assembly bears much of the burden of overcoming the inertial forces, and therefore these forces can damage the components of the drive assembly. The vehicle's body also bears some of the inertial forces, and therefore it too may be damaged during sudden changes in speed and direction. If these forces are significant enough, they may render a portion of the vehicle inoperational, thereby requiring repair or replacement of the vehicle. Even if immediate damage does not occur, repeated application of these forces may cause wearing and or deformation of the vehicle's body or drive assembly, which over time may also render the vehicle inoperational. The likelihood of damage to the vehicle increases as the size of the vehicles increases, as the vehicles are designed to move faster, and as the weight carried by the vehicles increases.

SUMMARY OF THE INVENTION

The present invention is directed to a children's ride-on vehicle having an electronic speed controller. The vehicle includes a body with a seat sized to accommodate at least one child, a steering mechanism positioned for operation by a child sitting on the seat to steer at least one of the vehicle's wheels, and a drive assembly with an actuator in the form of a user input device positioned for actuation by a child sitting on the seat to cause the driven rotation of at least one of the vehicle's wheels. The drive assembly includes a motor assembly and a battery assembly, which is adapted to provide power to the motor assembly. In some embodiments, the drive assembly includes one or more additional user input devices that enable a child sitting on the seat to select at least one of the relative speed and direction of the vehicle, namely by controlling the direction and speed of rotation of the vehicle's driven wheel or wheels. The drive assembly also includes an electronic speed controller that controls electronically the transmission of a rotational input from the motor assembly to the vehicle's driven wheel or wheels responsive at least in part to one or more user inputs selecting the rotational input. Nonexclusive examples of the control, or regulation, provided by the electronic speed controller include interjecting at least one of a predetermined delay, period of braking, or a controlled ramp, or rate, of transmission of the selected rotational input.

DETAILED DESCRIPTION AND BEST MODE OF THE INVENTION

Figure 1:
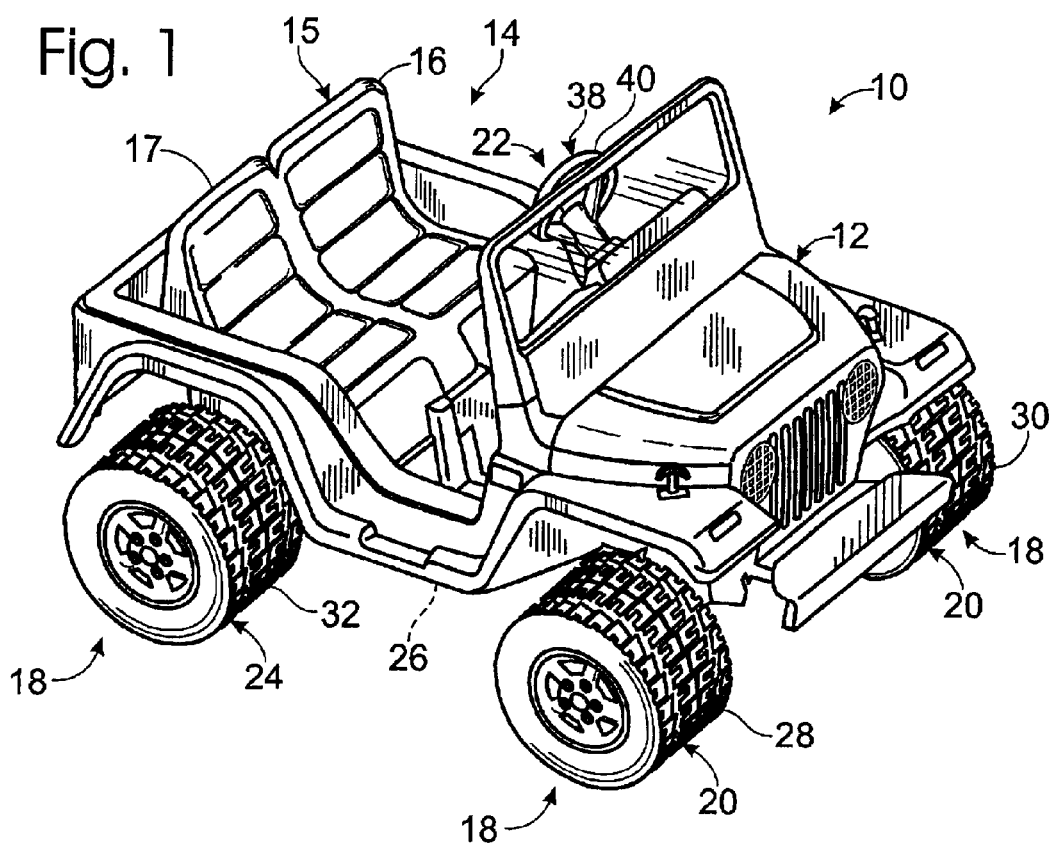
FIG. 1 is an isometric view of a children's ride-on vehicle.
Figure 2:
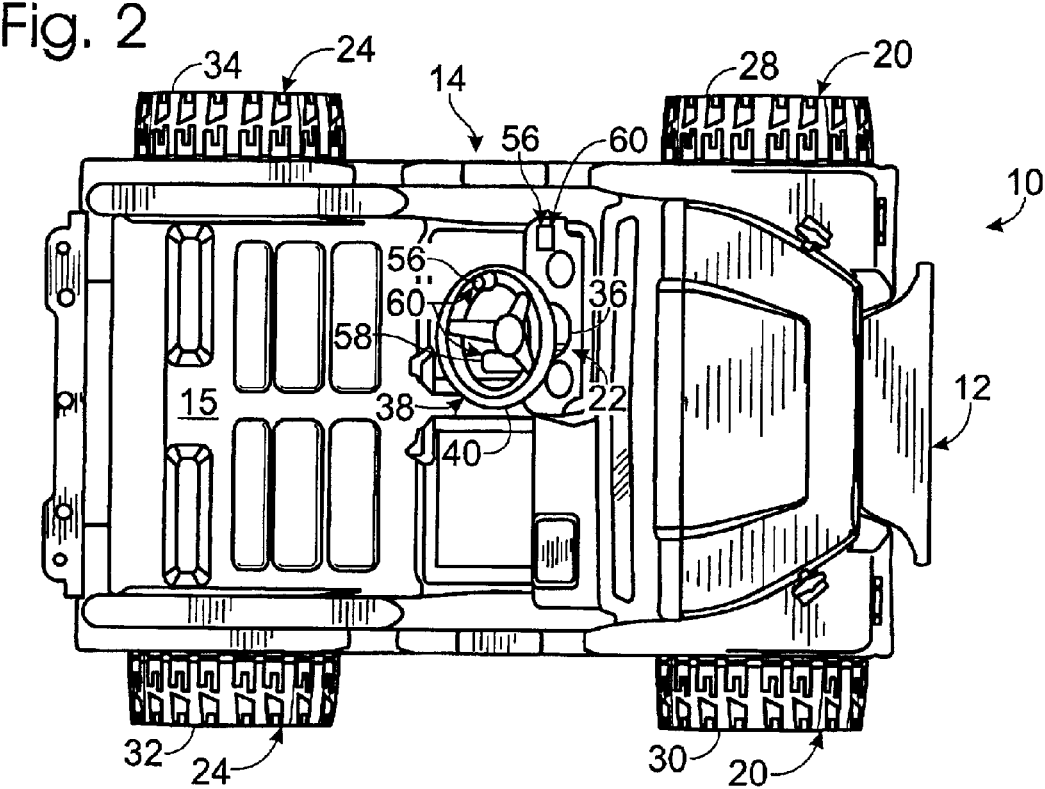
FIG. 2 is a top plan view of a children's ride-on vehicle.

A children's ride-on vehicle is shown in FIGS. 1 and 2 and indicated generally at 10. Ride-on vehicle 10 includes a body 12 that provides a riding space, or passenger compartment, 14 with a seat assembly 15 that is sized to accommodate at least one child, including a child driver. Seat assembly 15 may be integral with or otherwise mounted on body 12 and may have any suitable configuration, including configurations in which the position of the seat assembly is adjustable within the passenger compartment, and configurations in which the seat assembly includes two or more seats or two or more seating regions. Typically, vehicle 10 will be sized for use either by a child driver or by a child driver and a child passenger. For example, in the illustrated embodiment, seat assembly 15 includes a pair of seats, or seating regions, 16 and 17, with seat 16 sized and positioned to receive a child driver and seat 17 sized and positioned to receive a child passenger.

Body 12 typically is formed from molded plastic and may be integrally formed or formed from a plurality of parts that are secured together by screws, clips or other suitable fasteners. Alternatively, body 12 may be made of some other suitable material including metal, wood, or composite structure having suitable strength to accommodate and support the weight of at least one child. Body 12 may include an underlying frame on which a chassis is mounted. In such an embodiment, the frame is often formed of metal and/or molded plastic, with the chassis formed of molded plastic.

As shown, body 12 is shaped to generally resemble a reduced-scale Jeep® vehicle. It should be understood that a children's ride-on vehicle according to the present invention may be shaped to generally resemble any type of vehicle. Examples of suitable vehicles are reduced-scale or child-sized vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. When a children's ride-on vehicle is sized and shaped to generally resemble an adult-sized vehicle, its body and/or other components will often generally resemble corresponding components on the full-sized vehicle. However, it is also within the scope of the present invention that vehicle 10 may be shaped to resemble fantasy vehicles that do not have a corresponding adult-sized counterpart.

Vehicle 10 also includes a plurality of wheels 18 that are rotatably coupled to body 12, as indicated in FIG. 1. The plurality of wheels includes a steerable wheel assembly 20 that contains at least one wheel adapted to be steered by the vehicle's steering assembly 22, typically at least partially in response to user inputs thereto. The plurality of wheels also includes a driven wheel assembly 24 that contains at least one wheel adapted to be rotationally driven by the vehicle's drive assembly 26. It should be understood that the term "driven wheel" refers to a wheel that is rotated directly in response to a rotational input from the vehicle's drive assembly, which is either directly conveyed to the wheel by the output of the motor assembly or conveyed through a linkage, such as a gearbox, belt, chain, gear assembly, axle, or the like. In the illustrated embodiment, vehicle 10 includes four wheels 18, with forward wheels 28 and 30 forming steerable wheel assembly 20, and rear wheels 32 and 34 forming driven wheel assembly 24. It should be understood that the number of wheels on the vehicle may vary from two wheels to four, six or more wheels, although children's ride-on vehicles typically include at least three wheels for stability. Similarly, each wheel assembly must contain at least one wheel, and a particular wheel may form all or a portion of both the steerable wheel assembly and the driven wheel assembly. For example, it is within the scope of the invention that either or both of front wheels 28 and 30 or rear wheels 32 and 34 are driven and steerable. Similarly, one front wheel and one rear wheel may be driven and/or steerable, or the vehicle may include one or more driven or steerable wheels underneath its body that are generally hidden by the body of the vehicle.

A portion of the vehicle's steering assembly 22 is shown in FIGS. 1 and 2 and includes a steering column 36 and a steering mechanism 38. The steering assembly enables a child sitting on seat 16 to steer the vehicle's steerable wheel assembly 20 via user-applied steering inputs to steering mechanism 38, which is positioned on vehicle 10 for operation by a child sitting on seat 16. In the illustrated embodiment, steering mechanism 38 takes the form of a steering wheel 40. It should be understood that other suitable structures, such as handlebars and steering levers may be used. Steering column 36 includes any suitable mechanical linkage that conveys a child's steering inputs from the steering mechanism to the vehicle's steerable wheel assembly, thereby steering the vehicle.

Figure 3:
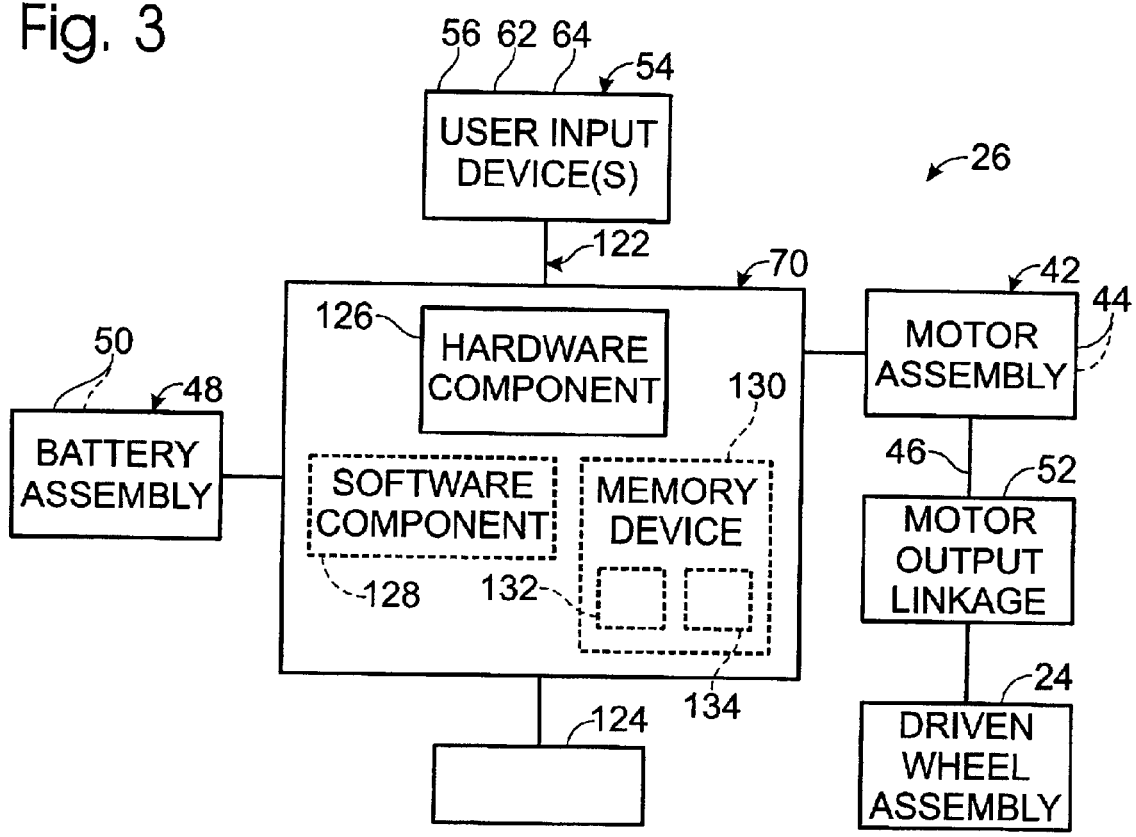
FIG. 3 is a schematic diagram of a drive assembly that includes an electronic speed controller according to the present invention.

In FIG. 3, drive assembly 26 of vehicle 10 is schematically illustrated. Drive assembly 26 is adapted to drive the rotation of driven wheel assembly 24. The drive assembly includes a motor assembly 42, which includes at least one motor 44. The motor assembly includes an output 46 that transmits a rotational input from the motor assembly to the driven wheel assembly. Typically, the output 46 from each of the one or more motors includes a rotating shaft and/or a rotation pinion or output gear. It should be understood that output 46 may include more than one shaft, pinion and/or gear, such as when motor assembly 42 includes more than one motor and/or when driven wheel assembly 24 includes more than one wheel. Drive assembly 26 further includes a battery assembly 48, which includes at least one battery 50 adapted to provide power to the motor assembly. Any suitable battery may be used, and the batteries may be rechargeable batteries. For example, one or more six-, twelve-, eighteen- or twenty-four-volt batteries have proven effective.

In FIG. 3, drive assembly 26 is shown including a motor output linkage 52 that mechanically interconnects the motor assembly with the driven wheel assembly. Motor output linkage 52 is any suitable mechanism that transmits the rotational input from the motor assembly's output(s) to the driven wheel assembly. Examples of suitable linkages 52 include an intermediate linkage between the output and the driven wheel assembly, such as a gearbox containing one or more gears, a belt or chain drive, a worm gear, one or more individual gears, and the like. The motor output linkage may be adapted to transmit the rotational input from the motor assembly to the driven wheel assembly at the same relative rate of rotation, or it may mechanically augment the rotational input to convey a greater or lesser rate of rotation relative to the rate of rotation of the output of the motor assembly. It is also within the scope of the invention that drive assembly 26 may be formed without linkage 52, in which case the output(s) 46 of the motor assembly directly transmit the rotational input to the driven wheel assembly.

Drive assembly 26 also includes one or more user input devices 54 that convey inputs from a child sitting on seat 16 to the drive assembly. Devices 54 may also be referred to as user control devices. Devices 54 convey a user's inputs to the vehicle's wiring harness and affect the actuation of the motor assembly, such as by causing the actuation (or energization) of the motor assembly, selecting between a range of electronic configurations, selecting the direction of rotation of the motor assembly's output, selecting the relative degree of a maximum rate of rotation to which the motor assembly is actuated, etc. Examples of suitable devices 54 include a drive actuator 56, through which a user input directing the battery assembly to energize the motor assembly is received. Examples of suitable drive actuators 56 include an on/off switch, a foot pedal, a throttle lever, and a rotational handgrip on a steering mechanism that includes a handlebar. In FIG. 2, an example of a drive actuator 56 is shown in the form of a foot pedal 58 positioned for actuation by a child sitting on seat 16. When drive actuator 56 takes a form other than a foot pedal, it may be located in any suitable location within or near passenger compartment 14 so that a child sitting on seat 16 may reach the actuator. For example, an on/off switch or throttle may be located on the body or on the steering mechanism, such as schematically illustrated at 60 in FIG. 2.

Other examples of user input devices 54 include a speed switch 62, which enables a user to select the relative rate of rotation of the motor assembly's output 46, and a direction switch 64, which enables a user to select the relative direction (i.e., clockwise or counterclockwise) of rotation of output 46. Switches 62 and 64 may be located in any suitable location on body 12 or steering assembly 22 for actuation by a child sitting on seat 16. An example of a suitable speed switch 62 is a switch that selectively configures a pair of batteries between series and parallel configurations to define relative "high" and "low" speed configurations. Switch 62 may additionally or alternatively selectively configure a pair of motors between series and parallel configurations.

Drive assembly 26 further includes an electronic speed controller 70, which is adapted to control electronically the transmission of the rotational input from the motor assembly to the driven wheel assembly. More specifically, controller 70 controls the actuation, or energization, of the motor assembly by the battery assembly to regulate electronically the rotational input transmitted by the motor assembly to the driven wheel assembly. Controller 70 may regulate at least one of the timing and the ramp, or rate, of application of the transmission of the rotational input after actuation of a corresponding user input device by a child sitting on seat 16. In other words, the controller delays in at least time and/or rate of transmission the rotational input to the driven wheel assembly responsive at least in part to a user input selecting the desired, or selected, rotational input.

For purposes of illustration, FIG. 3 depicts at 72 a somewhat simplified graph comparing the percentage of the selected rotational input that is transmitted to driven wheel assembly 24 as a function of time. By "somewhat simplified," it is meant that the profiles have been normalized to remove fluctuations or transformations due to friction inherent in all children's ride-on vehicles, current fluctuations or losses during transmission, inherent momentary delays from user-selection to vehicular response, and deviations that may be experienced during actual use when the vehicle is driven by children having different weights, used to transport different numbers and sizes of children, driven over varying types, elevations, and/or slopes of ground surfaces, etc. It should be understood that the actual units of time have not been indicated because they may vary, such as depending upon the particular type of vehicle, type of battery assembly, motor assembly, motor output linkage, etc. Instead, a relative comparison is presented. Similarly, it should be understood that the selected rotational input may vary in magnitude, such as depending upon one or more of the above factors, as well as one or more of the currently selected direction of travel, the currently selected speed (i.e., high, medium, low), the degree to which the drive actuator is actuated, etc.

Figure 4:
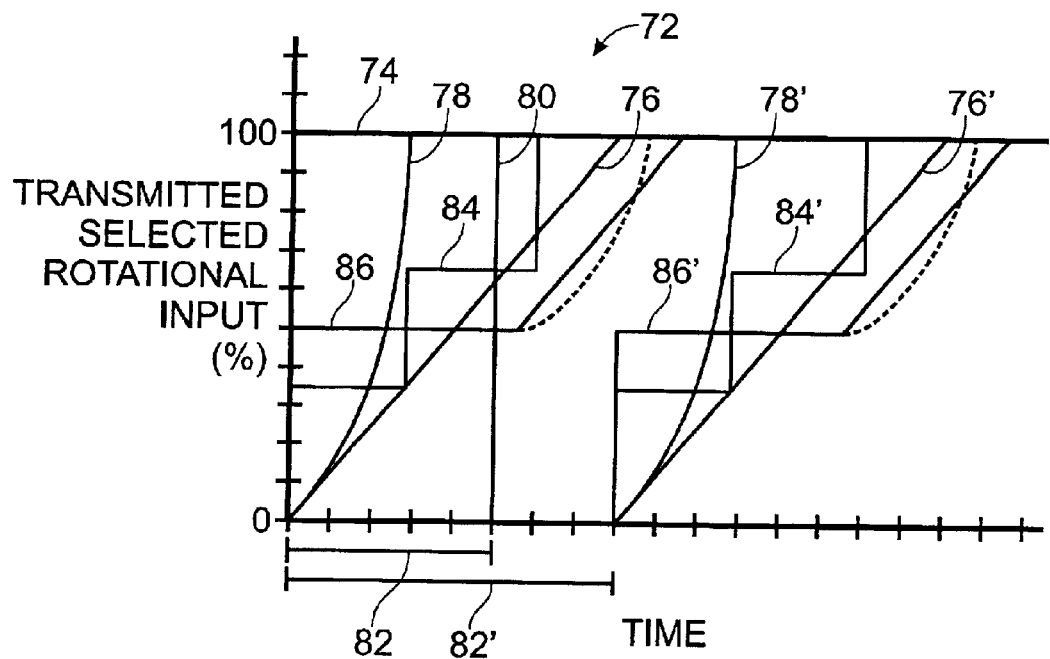
FIG. 4 is a graph comparing the transmitted percentage of the user-selected rotational input over time for a conventional battery-powered children's ride-on vehicle and battery-powered children's ride-on vehicles having electronic speed controllers according to the present invention.

As shown in FIG. 4 at 74, the transmission of the selected rotational input to the driven wheel assembly, which may be referred to herein as a transmission profile, for a conventional battery-powered children's ride-on vehicle is shown. As illustrated, the selected rotational input is entirely transmitted to the driven wheel assembly upon user actuation of the corresponding device(s) 54. At 76 and 78, transmission profiles are respectively shown that represent controller 70 regulating the transmission of the selected rotational input to increase over time in linear and curved (exponential, logarithmic, or other non-linear relationship) relationships. At 80, an example of a transmission profile is shown that illustrates controller 70 regulating the transmission of the selected rotational input to introduce a predetermined amount of delay, which is indicated at 82, before the selected rotational input is transmitted to the driven wheel assembly. As still a further example, at 84, a stepped transmission profile is shown, in which controller 70 regulates the transmitted percentage of the selected rotational input to be applied in time-incremented quantities.

It should be understood that the profiles shown in graph 72 are intended to illustrate examples of the comparative effects of controller 70 compared to a vehicle that does not include such a controller, and that many other such profiles are possible, such as profiles having different slopes, origins, maximums, curvatures, etc. and within the scope of the invention. It is further within the scope of the invention that controller 70 may be configured to regulate the transmission of the selected rotational input in a way that combines elements of two or more of the above-discussed transmission profiles. For example, at 86 a transmission profile is shown that includes both stepped and linear (or curved) regions. As still further examples, at 76', 78', 84', and 86' profiles 76, 78, 84 and 86 are shown further including initial periods of delay, which are indicated at 82'.

Controller 70 may regulate the transmission of the rotational input to driven wheel assembly 24 when vehicle 10 is starting from an at-rest, or unpowered, configuration. However, it is also within the scope of the invention, that controller 70 may, but does not necessarily, regulate the transmission of rotational input to the driven wheel assembly responsive to user inputs that select a change in speed and/or direction while the vehicle is already being driven (and accordingly, in which the driven wheel assembly is already receiving a rotational input from the motor assembly. For example, when a vehicle is already being driven in a selected direction and at a selected rotational input, the child may thereafter select a change in the direction of driven travel (in vehicles that include such a feature) and/or a change in the selected rotational input, such as to speed up or slow down the vehicle (in vehicles that include such a feature). Controller 70 may be adapted to control the rate and/or timing of the change in the selected rotational input upon the occurrence of either or both of these events.

When controller 70 regulates either the timing or rate of transmission of the selected rotational input, vehicle 10 will travel at a slower speed than a similar vehicle without the controller. This slower speed may be an actual reduction in speed due to indirect or direct braking of the vehicle, but also may be simply a comparatively slower speed because the controller has delayed in time and/or rate of application the transmission of the selected rotational input to the driven wheel assembly compared to a corresponding vehicle without the speed controller. More specifically, in periods where the driven wheel assembly is receiving none, or only a percentage (<100%) of the selected rotational input, the vehicle is not being driven at the speed at which a corresponding vehicle without controller 70 would be driven. Furthermore, and especially where the controller imparts a predetermined delay before the selected rotational input (or change therein) begins being transmitted to the driven wheel assembly, the delay may be utilized to slow the speed of the vehicle due to the inherent friction and inefficiency of the vehicle when it is not being rotationally driven. This may be referred to as passive braking of the vehicle during the controller-induced delay in the transmission of the selected rotational input.

It is also within the scope of the invention that controller 70 may be adapted to actively brake or otherwise reduce the speed of the vehicle at least partially in response to a user selecting a particular rotational input. For example, when a user selects a change in direction and/or speed of the vehicle, controller 70 may cause the vehicle to brake for a predetermined period of time or until the vehicle's speed or the rate of rotation of the motor's output, the driven wheel, etc., falls below a predetermined threshold value. An illustrative example of a mechanism for actively braking the vehicle is to temporarily short the motor assembly. Another example is for the drive assembly to be configured to automatically brake the vehicle when the motor assembly is not energized. Yet another example is to brake the vehicle by controller 70 sending control signals to produce a relatively short pulse of rotational input from the motor assembly in the opposite direction than the vehicle is traveling.

Figure 5:
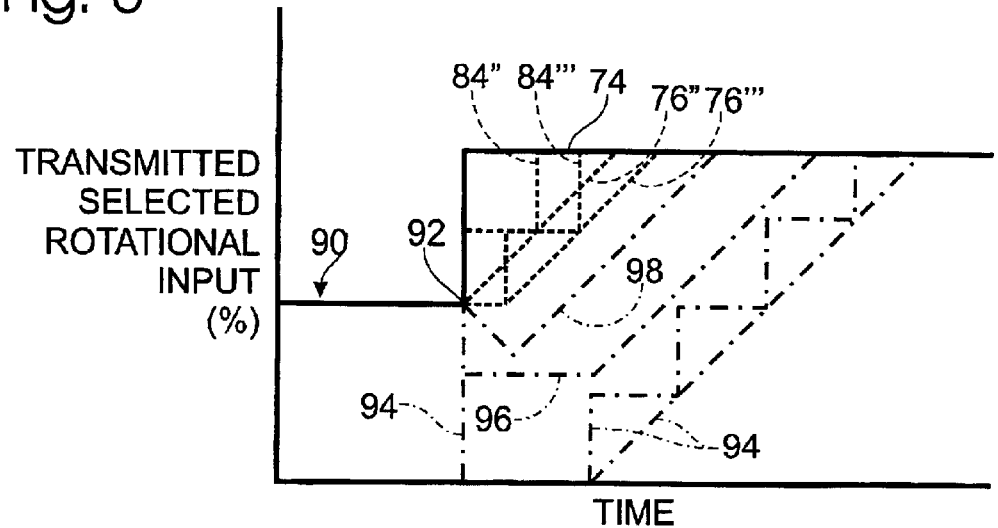
FIG. 5 is another graph comparing the transmitted percentage of the user-selected rotational input over time for a conventional battery-powered children's ride-on vehicle and battery-powered children's ride-on vehicles having electronic speed controllers according to the present invention.

In FIG. 5, another graph is shown to provide additional examples of how controller 70 may control, or regulate, the transmission of a selected rotational input to a vehicle. Similar to the graph shown in FIG. 4, FIG. 5 also compares the controlled transmission profiles to the comparative transmission profile 74 of a similar vehicle without controller 70. In the graph of FIG. 5, the transmission profiles illustrate a vehicle that is traveling at a first selected rotational input, which is generally indicated at 90, and then at 92 a second rotational input is selected by a user, such as when the child actuates user inputs 54 to change the speed and/or direction of the vehicle. As indicated in dashed lines at 76" and 84", representative examples of controlled transmission profiles are shown in which controller 70 regulates the ramp or rate of increase of the selected rotational input, which in the illustrative example is a second selected rotational input. As discussed, the shape of these transmission profiles may vary.

Also shown in dashed lines at 76''' and 84''' are further examples of controlled transmission profiles in which the controller also applies a predetermined delay before transmitting the second selected rotational input to the driven wheel assembly. In profiles 76''' and 84''', the controller maintains the previously selected rotational input for the period of delay and then causes the incremental or other transmission of the selected rotational input. In dash dot lines in FIG. 5, illustrative examples of controlled transmission profiles are shown in which the controller directs either a period of coasting or a period in which a rotational input is transmitted to the driven wheel assembly that is less then the previously selected rotational input. Either situation will cause the vehicle to slow down compared to a corresponding vehicle without the controller, and may additionally include active braking of the vehicle prior to transmission of the (second) selected rotational input. It should be understood that the coasting or reduced transmission and/or braking may be followed by essentially instantaneous transmission of the selected rotational input; however, controller 70 will typically follow the predetermined braking period with at least one of a predetermined delay and/or controlled ramp. In FIG. 5 at 94, an example of a transmission profile is shown in which the controller causes no rotational input to be transmitted to the driven wheel assembly for a predetermined time period after the user input, and then the second selected rotational input is transmitted to the driven wheel assembly via a controlled ramp. At 96, the controller decreases the rotational input that is transmitted to the driven wheel assembly and then applies the second selected rotational input, such as with a predetermined ramp. As yet another example, at 98, the controller decreases the transmitted rotational input via a controlled decreasing ramp, and then transmits the second selected rotational input via a controlled ramp.

Figure 6:
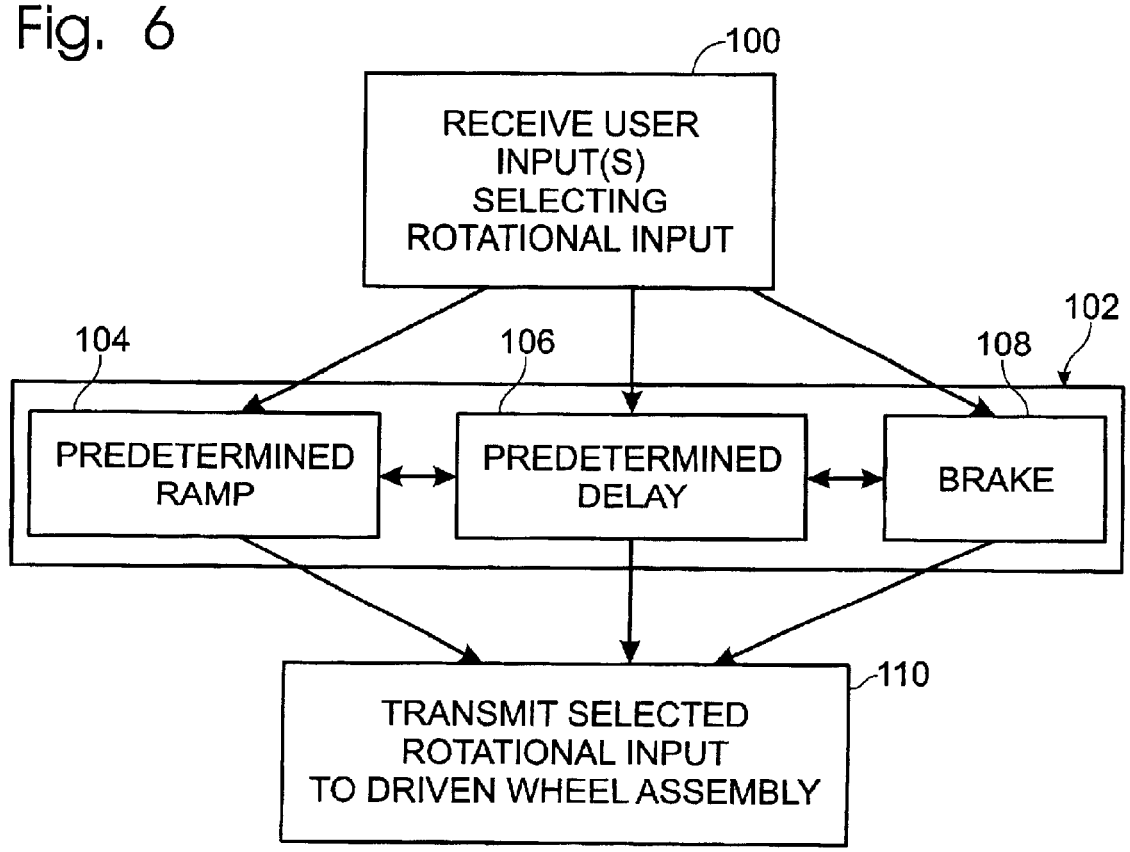
FIG. 6 is a flow chart showing illustrative examples of electronic speed control according to the present invention.

From the above examples, it should be understood that controller 70 may regulate at least one of the timing at which a selected rotational input is transmitted to the driven wheel assembly, the rate at which the selected rotational input is transmitted to the driven wheel assembly, and/or whether the vehicle is actively or passively braked prior to transmitting the selected rotational input to the driven wheel assembly. These methods of electrically controlling the transmission of a selected rotational input to the driven wheel assembly are graphically illustrated in FIG. 6. At 110 a user input is received selecting a desired rotational input. It should be understood that this may include selecting a particular rotational input from an idle or resting configuration or selecting a particular change in rotational input when the vehicle is already being driven. At 102, the controller regulates the transmission of the selected rotational input via at least one of a predetermined ramp 104, a predetermined delay 106, and/or a predetermined period of braking 108. After this electronic regulation of the selected rotational input is completed, the selected rotational input is fully transmitted to the driven wheel assembly, as indicated at 110.

It should also be understood that the particular type of transmission profile to be produced via controller 70 may vary with user preferences, the construction and intended use of the vehicle, and the particular rotational input being selected, etc. For example, a period of delay is useful when it is desirable for controller 70 to provide a period of time for the vehicle to coast or be slowed down prior to transmission of the selected rotational input. This period of delay generally reduces the inertia of the vehicle, thereby reducing the strain imparted thereto (and to the driver) when the vehicle is suddenly accelerated or the direction of travel is suddenly reversed. Of course, in embodiments of controller 70 in which the controller is configured to regulate the transmission of the selected rotational input when the vehicle is starting from an at-rest position, it is preferable that the controller utilize another form of regulation, either in addition to or in place of a period of delay. As another example, a controlled ramp tends to reduce the strain on the vehicle's drive assembly, body and/or the user's body when the vehicle undergoes a rapid acceleration, either from an at-rest or moving position. This strain may be even more pronounced when the vehicle is also directed to change directions (i.e. forward to reverse or vice versa). Therefore, controlling the rate of application of the selected rotational input may provide a "soft start" or "soft transition" that reduces or eliminates these forces by more gradually transmitting the selected rotational input. As yet another example, and particularly (but not exclusively) when the vehicle is starting from an at-rest position, it may be desirable to initially transmit a predetermined percentage of the selected rotational input, such as 15–50%, 20–30%, 25%, etc. to provide an initial acceleration from an at-rest position or a noticeable change in speed from an in-motion position, and then electronically control the rate of application of the remaining percentage of the selected rotational input.

It is also within the scope of the invention that controller 70 may only selectively control the transmission of the selected rotational input. By this it is meant that the controller may alternatively be configured not to automatically control the transmission of the selected rotational input in all situations. Instead, controller 70 may be configured to only control the transmission if certain other parameters or thresholds are satisfied. For example, controller 70 may only regulate the transmission of rotational input when the selected rotational input occurs when the vehicle is already being driven (such as during a user-selected change in speed or direction), when the vehicle is already traveling at more than a predetermined speed (actual or selected), when the vehicle changes direction, when the selected rotational input is greater than the existing (actual or selected) rotational input, when the vehicle is traveling a particular direction, etc.

Figure 7:
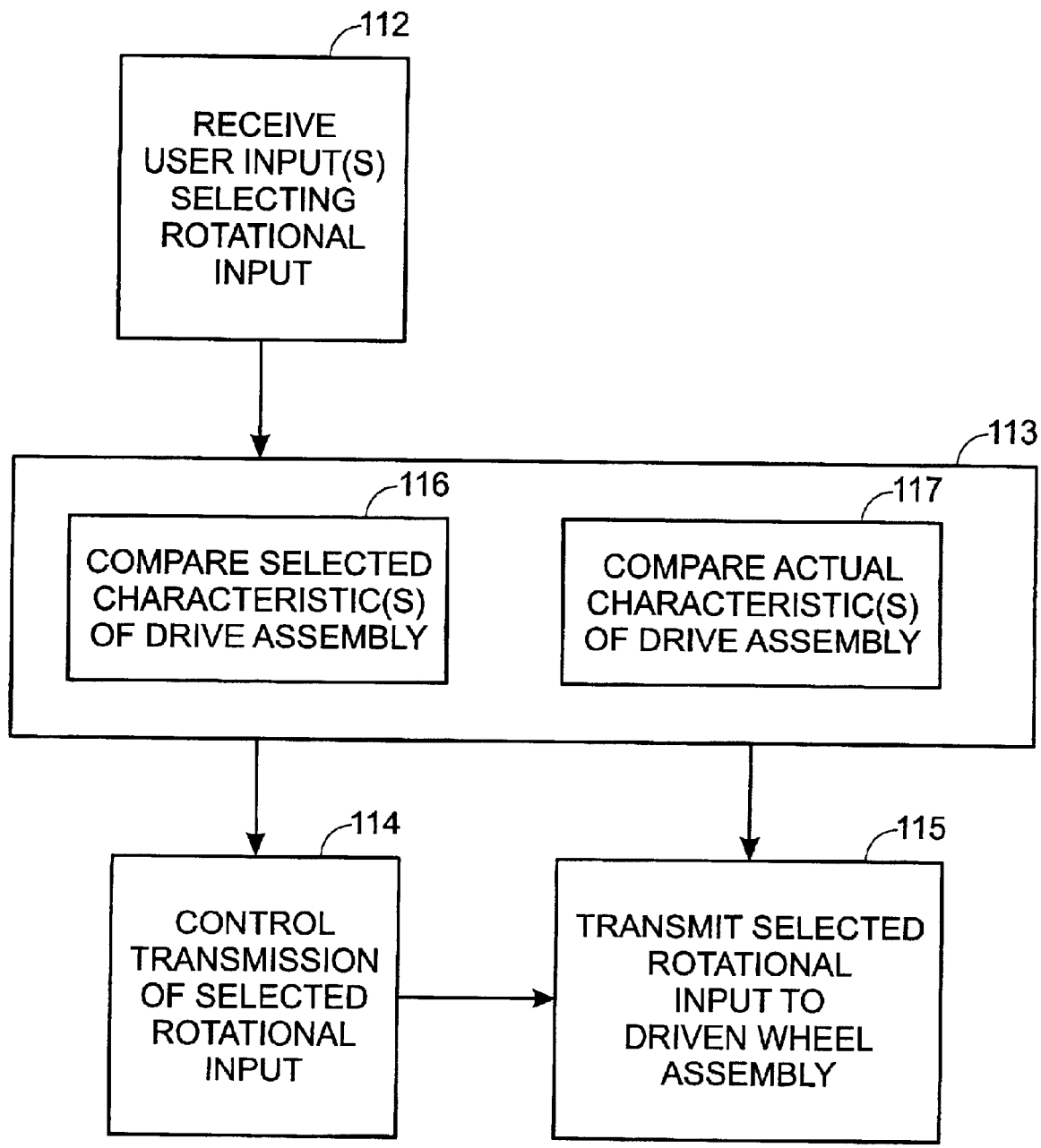
FIG. 7 is a flow chart showing illustrative examples of selective electronic speed control according to the present invention.

A flowchart illustrating examples of configurations in which controller 70 may selectively regulate the transmission of the selected rotational input is shown in FIG. 7. As shown, at 112, a user selects a rotational input, such as via one or more user input devices 54. This input is communicated to the controller, which at 113 determines whether the controller should regulate the transmission of the selected rotational input. If so, then at 114 the transmission of the selected rotational input is electronically controlled, or regulated, such as in any one or more of the manners previously described and/or illustrated. If not, then the selected rotational input is conveyed without electronic speed regulation, and as such the performance of the vehicle is essentially the same as a conventional battery-powered ride-on vehicle. Finally, at 115, the selected rotational input is fully transmitted to the driven wheel assembly.

As graphically indicated in FIG. 7 at 116 and 117, this determination may be based upon one or more of the selected operating characteristics of the vehicle's drive assembly when the child selects the rotational input and/or one or more of the actual operating characteristics of the vehicle when the rotational input is selected. In essence, the controller may compare the existing configuration of at least one portion of the vehicle's drive assembly when the rotational input is selected to one or more predetermined control instructions or values. Additionally or alternatively, the controller may compare the actual operating configuration of at least one portion of the vehicle's drive assembly when the rotational input is selected to the one or more predetermined control instructions or values. Examples of the actual or selected characteristics include one or more of the current direction of travel of the vehicle, the current speed of the vehicle, whether the vehicle is in motion or at rest, whether the selected rotational input is in the direction opposite the vehicle's current direction, and whether the selected rotational input is greater than the current rotational input. Typically, the selected characteristics will be measured or determined by the controller based at least in part upon the position of the user input devices. The actual characteristics may be determined via any suitable sensor or feedback mechanism that is in communication with the controller so that the controller receives a signal indicative of the measured characteristic, such as the direction and/or rate (if any) of rotation of a driven or steerable wheel, the motor output, etc., whether the motor assembly is actuated, whether (and to what extent) a load is being applied to the battery assembly, etc.

It is further within the scope of the invention that the controller may be adapted to vary the form of regulation (i.e. delay, ramp and/or braking) responsive to one or more of the above characteristics. For example, if the controller determines that the vehicle is at rest or selected to be at rest, then it may regulate the transmission of the selected rotational input by providing an initial step or predetermined percentage of the selected rotational input, followed by a controlled ramp of the remaining rotational input. However, if the controller determines that the vehicle is already in motion (or selected to be in motion), it may regulate the transmission of the selected rotational input without providing an initial step and/or by including an initial period of delay and/or braking. As a further example, the controller may regulate the transmission of the selected rotational input differently depending upon whether the selected rotational input is in the same direction as the actual or selected direction of travel of the vehicle.

An illustrative example of a suitable feedback mechanism is for the controller 70 to be adapted to regulate the delivery of the rotational input to driven wheel assembly 24 responsive at least in part to feedback corresponding to the rate of rotation of the motor output and/or the driven wheel assembly. Similarly, in embodiments of the invention in which the vehicle's steerable wheels are not driven wheels, it is further within the scope of the invention that controller 70 may additionally or alternatively receive inputs corresponding to the rate of rotation of at least one of the vehicle's steerable wheels. Examples of suitable mechanisms for measuring the rate of rotation of the vehicle's wheels include measuring the back EMF of the motor, determining the voltage using an analog to digital converter, and then from the voltage determining how much current is being drawn. Another suitable mechanism is to utilize a tachometer, optical sensor (which also may be used to determine the direction of rotation), or other suitable sensor or measuring device.

In embodiments of the controller that are adapted to measure the actual rate of rotation of one or more of the vehicle's wheels, the controller may also provide additional safety to the vehicle by comparing the difference between the selected rate of rotation and the actual rate of rotation. If these values vary by more than a predetermined threshold, which may be any predetermined difference, such as 5%, 10%, 25%, etc., then the controller may be adapted to automatically shut down the vehicle or otherwise stop actuation of the motor assembly. For example, if the vehicle is overloaded or its path is impeded by an obstacle, the vehicle's wheels may not rotate at the same, or even nearly the same, rate of rotation as the controller is directing the wheels to rotate. Accordingly, this may cause overheating or other damage within the drive assembly.

Controller 70 may be implemented via any suitable electronic (electrical) device or combination of devices. For example, controller 70 may be implemented entirely with hardware or may include software and hardware components. For example, controller 70 may include at least one of a digital or analog circuit, code, microprocessor, ASIC and the like. Controller 70 may be entirely implemented with analog components, or it may additionally or alternatively include a microprocessor or other programmable device in which software is stored. Returning briefly to FIG. 3, illustrative examples of suitable implementations for controller 70 are shown. For example, in FIG. 3, controller 70 includes a hardware component 126 that includes one or more devices adapted to at least partially perform the regulating function of controller 70. As discussed, controller 70 may additionally include a software component 128, such as shown in dashed lines. When the controller includes a software component, it may also include a memory device 130, such as to store software, look up values or tables, threshold values, measured values, etc. Memory device 130 may include volatile 132 and/or non-volatile 134 portions, as also graphically illustrated in FIG. 3. It should be understood that it is within the scope of the invention that controller 70 may perform functions other than those discussed herein with respect to regulating the speed at which the vehicle is driven.

As also shown in FIG. 3, it can be seen that the schematic representation of drive assembly 26 and controller 70 includes a wiring harness 122 that electrically interconnects user input device(s) 54, motor assembly 42, battery assembly 48 and controller 70. The term "wiring harness" is meant to broadly refer to any suitable structure used to operatively and electrically interconnect the components of drive assembly 26. Accordingly, harness 122 may include direct interconnections between one or more components of drive assembly 26, discrete connections that are independent of other connections, connections formed by structure other than wires, connections that do not extend to between each and every component of the drive assembly, communication links for control signals and measurements, communication links for transmitting current to drive motor assembly 42, etc. Furthermore, as schematically indicated at 124 in FIG. 3, the wiring harness may electrically interconnect components of vehicle 10 in addition to those shown in FIG. 3.

It should be understood that controller 70 may be positioned at any suitable location within the vehicle's wiring harness or electrical system. For example, the controller may be entirely positioned to receive signals from one or more of devices 54 and to responsively regulate directly or indirectly the transmission of power from battery assembly 48 to motor assembly 42. As another example, the controller may have a first controller assembly that performs the above function, such as with entirely hardware or hardware and software components, and then a second controller assembly that interconnects battery assembly 48 and motor assembly 42. Similar to the first assembly, the second controller assembly may be also be implemented in any suitable manner, such as entirely as hardware, as a combination of hardware and software components, etc. As yet another example, the controller may be entirely located to receive and regulate the transmission of power from battery assembly 48 to motor assembly 42.

Figure 8:
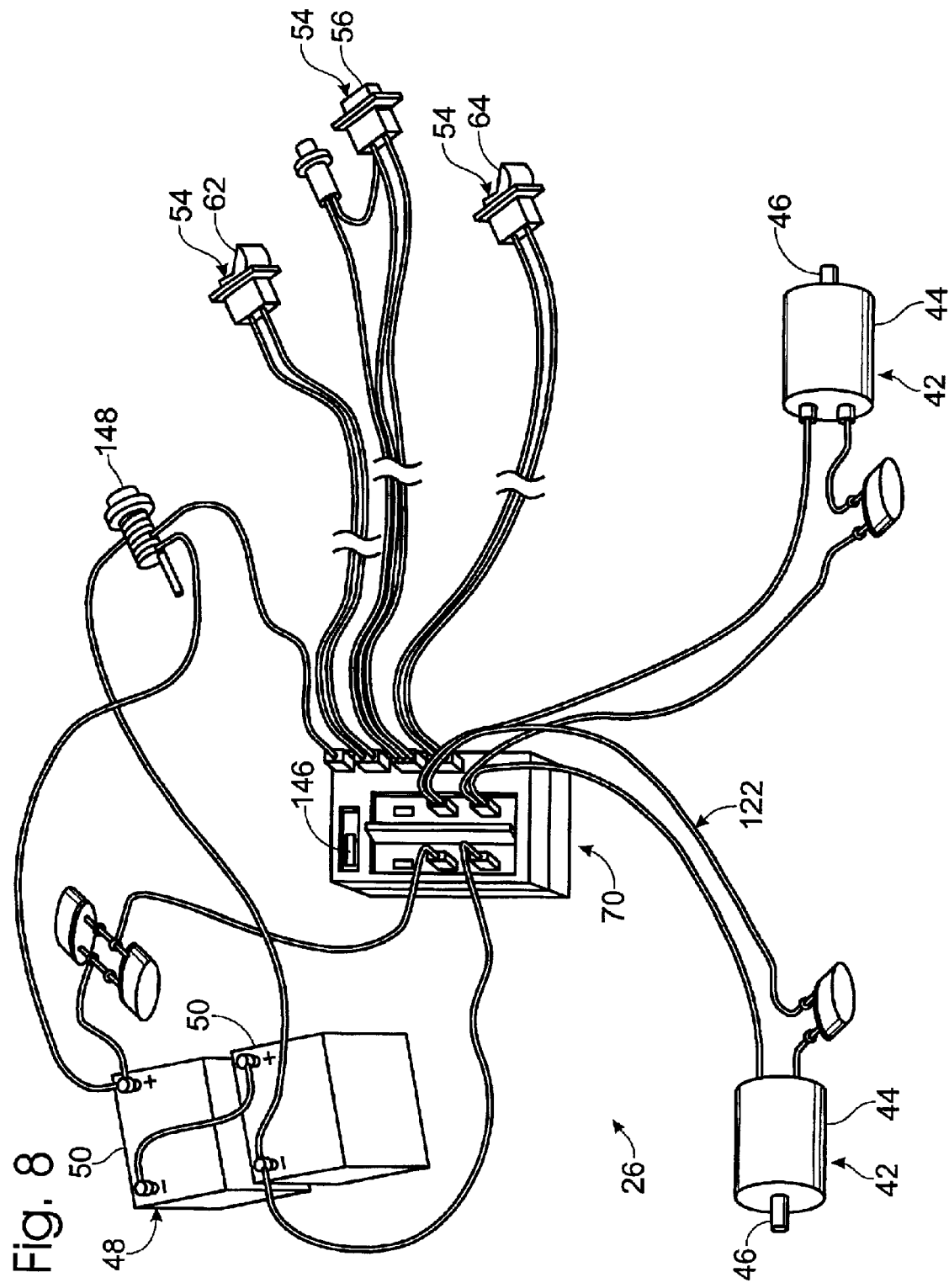
FIG. 8 is an isometric view of a drive assembly that includes an electronic speed controller according to the present invention.

In FIG. 8, an example of a drive assembly 26 having an electronic speed controller 70 is shown. In FIG. 8, drive assembly 26 is also shown including a high-speed lockout 146, which mechanically and/or electrically precludes configuration of the vehicle's drive assembly for high-speed operation. For example, parents may want to only let their children operate vehicle 10 at low speed settings until the child becomes comfortable steering and otherwise controlling the vehicle. Also shown is a charging portion 148, which may be used to recharge the vehicle's battery assembly. It should be understood that the drive assembly and controller may be formed without these components. A pair of batteries 50, a pair of motors 44 and multiple user input devices 54 have been shown in FIG. 8 for purposes of illustration. It should similarly be understood that a different number of batteries and motors (such as one or more than two) may be used, that only one or more of the illustrated user input devices may be used, and that user input devices other than the illustrated embodiments may be used and are within the scope of the present invention. Similarly, it should be understood that the user input devices have been schematically illustrated in FIG. 8 and that any suitable type of switch may be used, such as a pushbutton, lever, rocker switch, two-position switch, etc. It may be preferable for at least actuator 56 to be a fail-safe switch.

Figure 9:
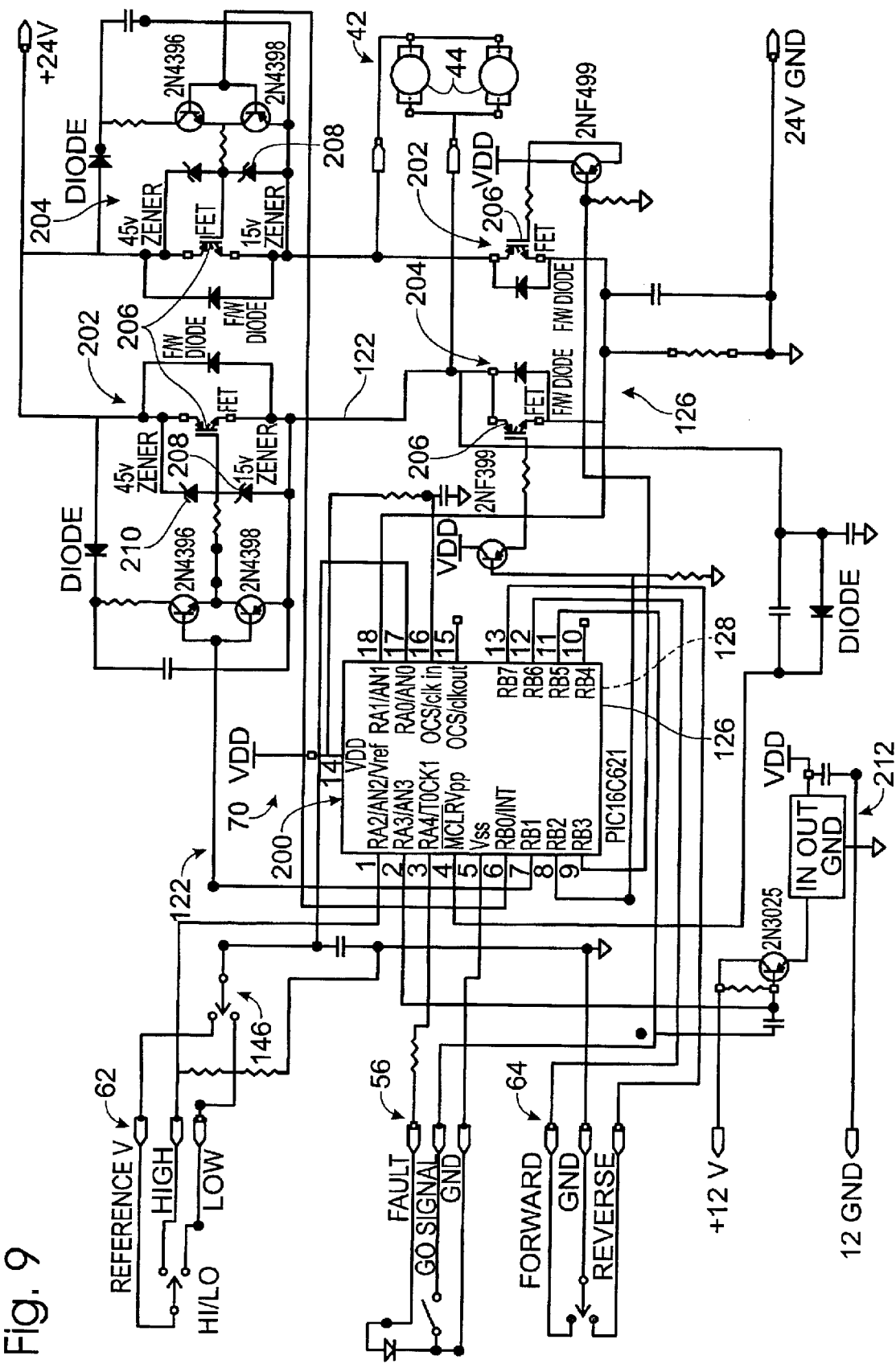
FIG. 9 is a circuit diagram of an illustrative electronic speed controller according to the present invention.

In FIG. 9 an illustrative example of a circuit diagram is shown for a controller 70 that includes both hardware and software components. In the illustrated embodiment, the controller includes a microprocessor 200 that is programmed to execute code (or other software) stored within a memory device 130 operatively associated therewith. As discussed, controller 70 may regulate the transmission of the selected rotational input in a variety of different ways, which may be implemented via any suitable mechanism. In embodiments that include a microprocessor, examples of suitable mechanisms include electronically controlling the rate at which the motor assembly is energized through pulse width modulation or any other suitable mechanism. Controller 70 may also be described as regulating the delivery of power to the motor assemblies through microprocessor-based duty cycle ramping. For example, to impose a delay between when a user selects the rotational input and when the rotational input is transmitted to the driven wheel assembly, microprocessor 200 may be programmed to require a predetermined time period to elapse after receiving an input signal indicative of the one or more user inputs selecting the rotational input. Upon expiration of this time period, then the microprocessor can send control signals to battery assembly 48 to energize motor assembly 42, either to transmit the full selected rotational input at once, or in some embodiments, to gradually transmit the selected rotational input according to a predetermined ramp profile. The rate, or ramp, at which the selected rotational input is transmitted may be implemented by the microprocessor sending control signals that selectively energize the motor assembly for predetermined pulses or intervals separated by periods, or relatively brief pauses, in which the motor assembly is not actuated. Typically, the microprocessor will be adapted to produce periods of energization that increase in duration and/or the periods of no energization that decrease in duration until the full selected rotational input is transmitted to the driven wheel assembly.

As shown, microprocessor 200 is in direct or indirect electrical communication with the user input devices 54, battery assembly 48 and motor assembly 42 of the vehicle's drive assembly. Examples of suitable microprocessors include PIC16C21 and PIC16C20A microprocessors. However, it should be understood that the controller may be otherwise implemented. Similarly, for purpose of illustration, the drive assembly is illustrated in the context of a 24-volt system, however, it should be understood that the drive assembly and controller may be configured for any other selected voltage, such as a six-, twelve-, eighteen-, or thirty-six-volt system.

As shown, controller 70 includes bridged switch assemblies 202 and 204 that selectively enable motors 44 of motor assembly 42 to be energized. Any suitable switches and switch assemblies may be used. In the illustrated embodiment, each switch assembly includes a FET (field effect transistor) 206, which may be coupled with Zener diodes 208 and 210, such as 15- and 45-volt diodes. N-channel, or n-type, IRF3205 or equivalent FETs have proven effective, although others, including P-channel FETs, may be used. It should be understood that other combinations of elements may be used, such as different configurations of Zener diodes, different types of diodes or equivalent structures, a standard transistor, and the like. Each FET may alternatively represent two or more FETS connected in parallel, such as to increase the current-handling capacity of the controller.

Also shown in the illustrative circuit diagram of FIG. 8 is a voltage regulator 212 that regulates the voltage being delivered to microprocessor 200, such as to 3.5 volts, 5 volts or any other suitable operating voltage. An advantage of having a voltage regulator is that the voltage delivered to the microprocessor is "smoothed," or generally not affected by noise and other aberrations or unintended fluctuations in the controller. Voltage regulator 212 may be used with any of the embodiments of the controller described herein, however, the controllers may also be formed without a voltage regulator or with a voltage regulator with a different construction.

Figure 10:
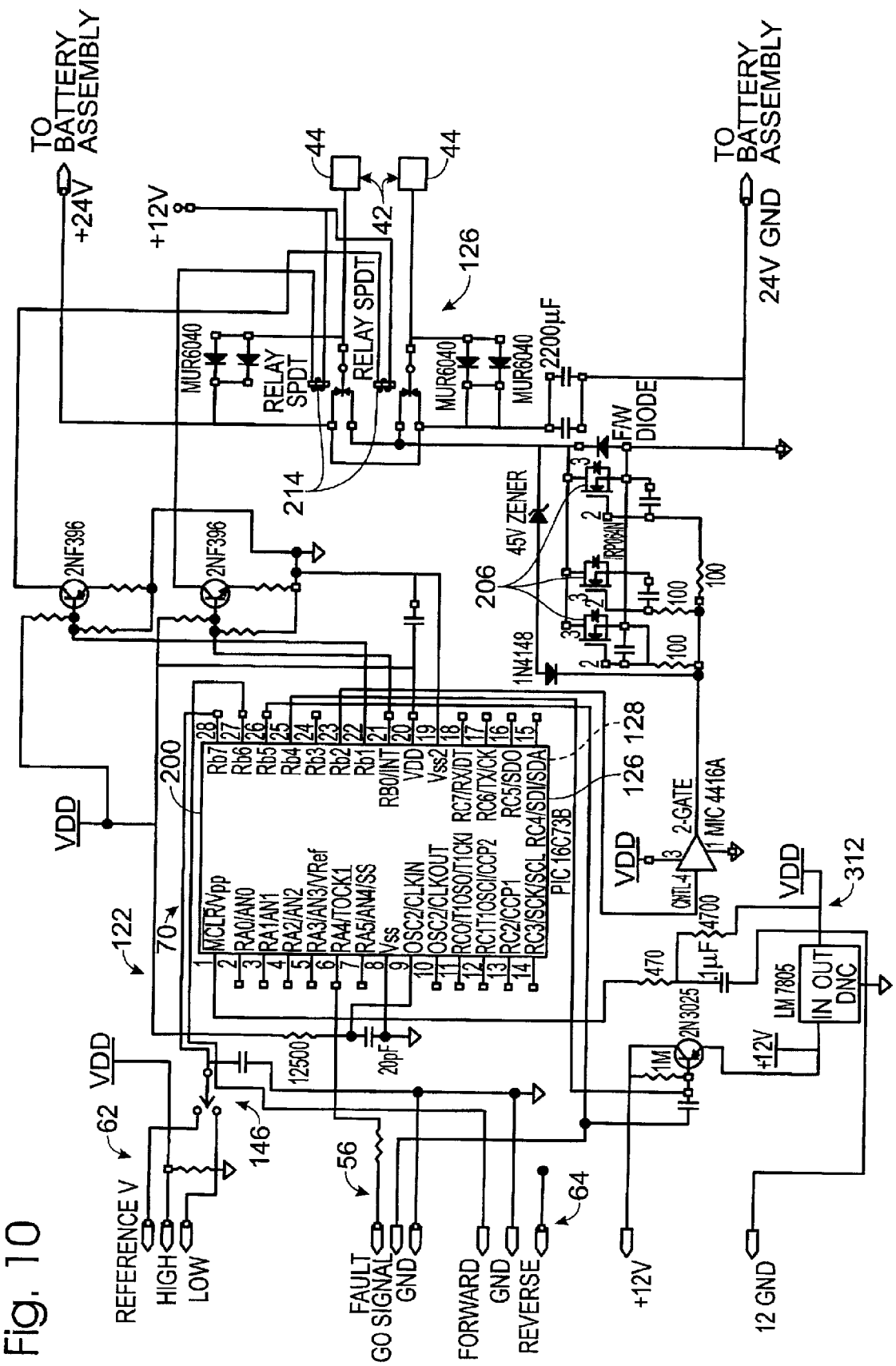
FIG. 10 is another circuit diagram of an electronic speed controller according to the present invention.

In FIG. 10, another embodiment of a controller 70 that includes hardware and software components is shown. Similar to the embodiment illustrated in FIG. 9, the controller includes a microprocessor 200, such as a PIC16C73B microprocessor. In the illustrated embodiment, the controller includes relays 214 that are used to configure the drive assembly for forward and reverse operation and in place of one or more of the FETs 206. FIG. 10 also illustrates the use of two or more FETs in parallel in place of a single FET. Similar to the controller described with respect to FIG. 9, other switching devices may be used in place of FETs 206 and/or relays 214 to control the amount of the supply current that is delivered from battery assembly 48 to motor assembly 42.

In the embodiments of controller 70 shown in FIGS. 9 and 10, it should be understood that the delivery of power to the motor assembly may be controlled according to any of the previously discussed mechanisms for regulating the transmission of the selected rotational input. When this mechanism is or includes a predetermined profile, such as a linear, exponential or other curved profile, stepped profile, or combinations thereof, the time period over which the selected rotational input is transmitted may extend over a predetermined time period, at the end of which the output of the motor assembly is rotating at the user-selected rate of rotation. For example, instead of instantaneously accelerating the motor's output to the user-selected rate of rotation, the controller may cause this rate of rotation to be achieved over a selected time period, such as one second, two seconds, five seconds, ten seconds or more. This gradual increase in speed reduces the forces on the vehicle and the user's body. It should be understood that the user-selected rate of rotation may be partially preselected, such as a defined high speed configuration and a defined low speed configuration, or the user may be able to select any rate of rotation between a selected range of rotations, such as from no rotation to a maximum rate of rotation. It should also be understood that the "instantaneous" acceleration described herein refers to the delivery of sufficient power from battery assembly 48 to achieve the selected rate of rotation without imparting an intentional delay or gradual ramp in the transmission of this rotational input.

In some embodiments, it may be desirable for controller 70 to also include a potentiometer, which communicates to microprocessor 200 the relative degree of actuation of drive actuator 56, such as the degree to which foot pedal 58 is depressed or the degree to which a throttle is rotated. In such an embodiment, the microprocessor may be configured, or programmed, to regulate a different ramp profile depending upon the inputs from the potentiometer. For example, a more aggressive, or lower duration, ramp profile may be used when the drive actuator is only partially actuated because this degree of actuator corresponds to a speed that is less than the maximum speed that may be selected. Accordingly, quickly accelerating to this speed will exert less force on the vehicle and child driver than if the vehicle was accelerated to its maximum speed in this same time period. It should be understood that embodiments of the control system that include a potentiometer may include a full spectrum potentiometer, in which a user may select any desired degree of actuation within a range bounded by upper and lower thresholds. However, it is also within the scope of the invention that the potentiometer may instead be simplified by comprising two or more switches that sequentially select defined increments within a range of positions depending upon which of the switches are actuated by a user. In such embodiments, microprocessor 200 may be further configured to control the ramp profile and/or other regulation of the selected rotational input responsive at least in part to the sequence and/or timing of the actuation of the two or more switches or other suitable user input devices.

Embodiments of the controller that include a microprocessor preferably, but not necessarily, include what may be referred to as a "watch dog timer." Having a watch dog timer essentially means that the controller is configured to automatically stop the vehicle, or at least stop actuation of the vehicle's drive assembly, if the microprocessor malfunctions, loses and regains power or otherwise gets lost or deviates from its program. This provides a safer controller because it provides a failsafe method of shut down. An example of an implementation for a watch dog timer, or automatic shut down mechanism, is for the controller to include a timer such that the microprocessor is programmed to reset in predetermined intervals, such as every 30 milliseconds or any other selected time period. If the timer is not reset within the predetermined time period, then the microprocessor is shut down.

Figure 11:
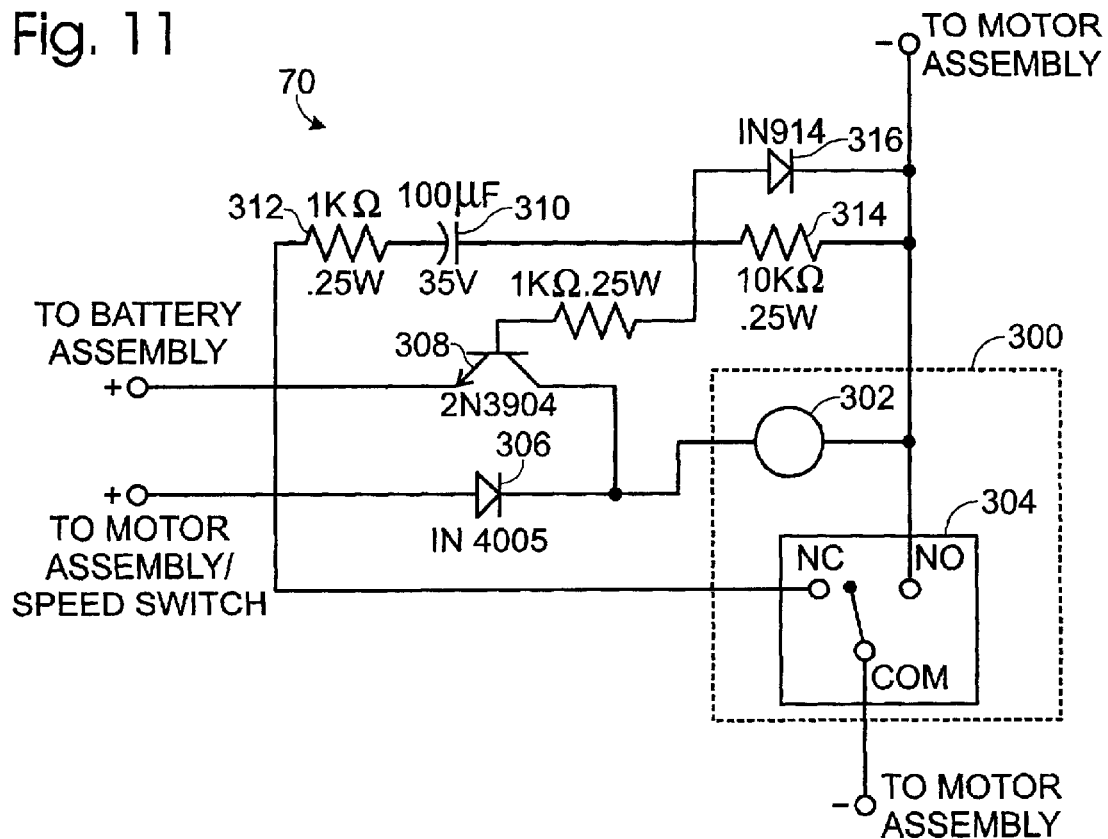
FIG. 11 is another circuit diagram of an electronic speed controller according to the present invention.

As discussed, controller 70 may be implemented with hardware and software components, or entirely with hardware components. An example of a analog implementation of controller 70 is shown in FIG. 11. In the particular example shown, the controller is adapted to regulate the timing of the transmission of a rotational input from the motor assembly responsive to the time at which the child driver actuates the user input devices to drive the vehicle in a forward direction. However, it is within the scope of the invention that any of the other methods of electronically regulating the transmission of the selected rotational input may also be implemented by analog components.

Controller 70 is adapted to delay for a predetermined time period the transmission of power to the motor assembly when the vehicle is driven in a forward direction from a reverse direction, such as when a child driver shifts direction switch 64 from its reverse position to its forward position. Controller 70 may also be adapted to delay for a predetermined time period the application of the rotational input when the vehicle is driven in a forward direction from a resting position, such as when the child driver actuates foot pedal 58, on/off switch 60 or another actuator 56. As discussed, this delay provides a period of time in which the speed of the vehicle may be directly or indirectly slowed.

As shown in FIG. 11, controller 70 includes a relay 300, which in the illustrated embodiment includes a coil 302 and a contact assembly 304. Any suitable relay or equivalent device may be used. In experiments, a 40 amp PCB relay has proven effective. When the vehicle is driven in a reverse direction, coil 302 is energized by battery assembly 48 directly through diode 306. When the vehicle is driven in a forward direction, the coil is energized by transistor 308. A capacitor 310 provides a delay before the threshold voltage, or base emitter voltage of transistor 308 is achieved. Resistors 312 and 314 form a voltage divider, which cooperates with the capacitor to define the time period of the delay. For example, when a 300 microfarad capacitor is used, 1 kilo ohm and 10 kilo ohm resistors 312 and 314 have proven effective to provide a delay of approximately one second. To increase or decrease this delay, the values of these resistors may be changed. For example, using 10 kilo ohm and 100 kilo ohm resistors for resistors 312 and 314, respectively, would provide a longer time period. Also shown in FIG. 11 is a diode 316 that helps increase the speed at which capacitor 310 discharges.

When the vehicle is driven in reverse, capacitor 310 is charged. When the vehicle is switched to the forward direction, the capacitor must discharge and be recharged in the opposite direction, or with the reverse polarity, before the base emitter voltage of the transistor may be achieved. When the vehicle starts from a rest position, a reduced time period of delay is provided because the capacitor only needs to be charged, not discharged and then charged.

Figure 12:
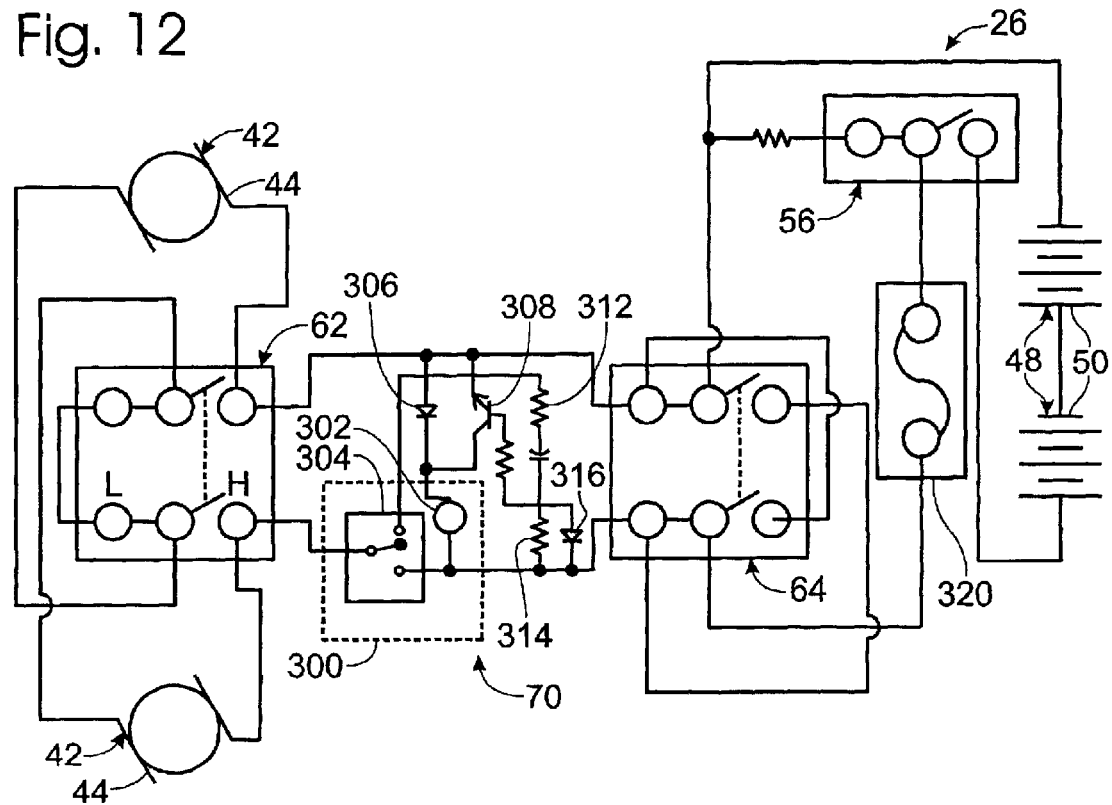
FIG. 12 is a schematic diagram of an embodiment of a drive assembly with the speed controller of FIG. 11.

In FIG. 12, the controller of FIG. 11 is shown in a suitable implementation within drive assembly 26. To further illustrate that battery assembly 48 may have a variety of voltages within the scope of the present invention, FIG. 12 demonstrates a battery assembly 48 that includes a pair of six-volt batteries 50, which alternatively could be replaced by a single 12-volt battery or one or more batteries with voltages other than six-volts. As shown, controller 70 interconnects the speed and direction switches of the drive assembly. It should be understood that the controller may be implemented elsewhere in the vehicle's wiring harness 122. Also shown in FIG. 12 is a circuit breaker 320 to provide additional protection in case of a short or other malfunction within the control system and/or other elements of the wiring harness.

INDUSTRIAL APPLICABILITY

The present invention is applicable to any motorized children's ride-on vehicles, and more particularly to children's ride-on vehicles with battery-powered motor assemblies.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A children's ride-on vehicle, comprising:
a body having a seat adapted to receive a child;
a plurality of wheels rotatably coupled to the body, wherein the plurality of wheels includes a driven wheel assembly and a steerable wheel assembly;
a steering assembly having a steering mechanism positioned for actuation by a child sitting on the seat and operatively connected to the steerable wheel assembly to transmit user-selected steering inputs to the steerable wheel assembly; and
a drive assembly, comprising:
a battery-powered motor assembly adapted to drive the rotation of the driven wheel assembly to propel the vehicle along a riding surface;
at least one user input device that is positioned for actuation by a child sitting on the seat and adapted to receive a user input selecting a selected rotational input; and
an electronic speed controller adapted to regulate, after receipt of the user input, the rate at which the selected rotational input is transmitted to the driven wheel assembly according to a predetermined transmission profile in which the selected rotational input is incrementally transmitted to the driven wheel assembly.

2. The children's ride-on vehicle of claim 1, wherein the predetermined transmission profile includes a linear increase in the percentage of the selected rotational input that is transmitted to the driven wheel assembly.

3. The children's ride-on vehicle of claim 1, wherein the predetermined transmission profile includes a step-wise increase in the percentage of the selected rotational input that is transmitted to the driven wheel assembly.

4. The children's ride-on vehicle of claim 1, wherein the predetermined transmission profile includes a non-linear increase in the percentage of the selected rotational input that is transmitted to the driven wheel assembly.

5. The children's ride-on vehicle of claim 1, wherein the electronic speed controller is adapted to regulate the transmission of a first percentage of the selected rotational input to the driven wheel assembly upon receipt of the user input selecting the selected rotational input, and further wherein the first percentage is less than 100% of the selected rotational input.

6. The children's ride-on vehicle of claim 5, wherein the first percentage is less than 50% of the selected rotational input.

7. The children's ride-on vehicle of claim 6, wherein the first percentage is in the range of 15% and 40% of the selected rotational input.

8. The children's ride-on vehicle of claim 5, wherein after the first percentage of the selected rotational input is transmitted to the driven wheel assembly, the electronic speed controller is further adapted to maintain the transmission of the first percentage for a predetermined time period and then regulate the transmission of a second percentage of the selected rotational input.

9. The children's ride-on vehicle of claim 8, wherein the second percentage is incrementally transmitted to the driven wheel assembly.

10. The children's ride-on vehicle of claim 8, wherein the second percentage is transmitted to the driven wheel assembly according to a predetermined transmission profile.

11. The children's ride-on vehicle of claim 10, wherein the predetermined transmission profile includes a linear increase in the percentage of the selected rotational input that is transmitted to the driven wheel assembly.

12. The children's ride-on vehicle of claim 10, wherein the predetermined transmission profile includes a step-wise increase in the percentage of the selected rotational input that is transmitted to the driven wheel assembly.

13. The children's ride-on vehicle of claim 10, wherein the predetermined transmission profile includes a non-linear increase in the percentage of the selected rotational input that is transmitted to the driven wheel assembly.

14. The children's ride-on vehicle of claim 1, wherein the electronic speed controller includes both hardware and software components.

15. The children's ride-on vehicle of claim 14, wherein the electronic speed controller includes a microprocessor, and further wherein the electronic speed controller is adapted to regulate the actuations of the motor assembly through microprocessor-based duty cycle ramping.

16. The children's ride-on vehicle of claim 14, wherein the electronic speed controller includes a microprocessor adapted to regulate the transmission of the selected rotational input through pulse width modulation of the actuation of the motor assembly.

17. The children's ride-on vehicle of claim 1, wherein the body is a reduced-scale version of an adult-sized vehicle.

18. The children's ride-on vehicle of claim 1, wherein the body is at least substantially formed from molded plastic.

19. The children's ride-on vehicle of claim 1, wherein upon actuation, the motor assembly is adapted to generate a rotational input that is transmitted to the driven wheel assembly, and further wherein the electronic speed controller is adapted to control electronically the actuation of the motor assembly to regulate the transmission of the rotational input.

20. The children's ride-on vehicle of claim 19, wherein the electronic speed controller is adapted to delay for a predetermined time period after receipt of the user input selecting the selected rotational input the transmission of the rotational input to the driven wheel assembly.

21. The children's ride-on vehicle of claim 20, wherein the predetermined time period is more than one second.

22. The children's ride-on vehicle of claim 20, wherein the predetermined time period is more than two seconds.

23. The children's ride-on vehicle of claim 19, wherein the electronic speed controller is adapted to regulate the rate at which the rotational input is transmitted to the driven wheel assembly according to a predetermined transmission profile in which the transmitted rotational input is increasingly transmitted to the driven wheel assembly until the transmitted rotational input is at least substantially equal to the selected rotational input.

24. The children's ride-on vehicle of claim 23, wherein the predetermined transmission profile includes a linear increase in the percentage of the selected rotational input that is transmitted to the driven wheel assembly.

25. The children's ride-on vehicle of claim 23, wherein the predetermined transmission profile includes a step-wise increase in the percentage of the selected rotational input that is transmitted to the driven wheel assembly.

26. The children's ride-on vehicle of claim 23, wherein the predetermined transmission profile includes a non-linear increase in the percentage of the selected rotational input that is transmitted to the driven wheel assembly.

27. The children's ride-on vehicle of claim 1, wherein the electronic speed controller is further adapted to regulate the transmission of the selected rotational input responsive at least in part to one or more selected characteristics of the drive assembly, and further wherein the one or more selected characteristics of the drive assembly include at least one selected characteristic that is selected during operation of the ride-on vehicle by a child sitting on the seat.

28. The children's ride-on vehicle of claim 27, wherein the one or more selected characteristics of the drive assembly includes at least one selected characteristic that corresponds to a selected direction of rotation of the driven wheel assembly.

29. The children's ride-on vehicle of claim 27, wherein the one or more selected characteristics of the drive assembly includes at least one selected characteristic that corresponds to a selected rate of rotation of the driven wheel assembly.

30. The children's ride-on vehicle of claim 1, wherein the electronic speed controller is further adapted to regulate the transmission of the selected rotational input responsive at least in part to one or more actual characteristics of the drive assembly, and further wherein the one or more actual characteristics of the drive assembly include at least one actual characteristic that is determined during operation of the ride-on vehicle.

31. The children's ride-on vehicle of claim 30, wherein the drive assembly includes at least one sensor adapted to measure the one or more actual characteristics.

32. The children's ride-on vehicle of claim 31, wherein the one or more actual characteristics corresponds to the rate of rotation of the driven wheel assembly when the user input selecting the selected rotational input is received by the electronic speed controller.

33. The children's ride-on vehicle of claim 31, wherein the one or more actual characteristics corresponds to the direction of rotation of the driven wheel assembly when the user input selecting the selected rotational input is received by the electronic speed controller.

34. A children's ride-on vehicle, comprising:
a body having a seat adapted to receive a child;
a plurality of wheels rotatably coupled to the body, wherein the plurality of wheels includes a driven wheel assembly and a steerable wheel assembly;
a steering assembly having a steering mechanism positioned for actuation by a child sitting on the seat and operatively connected to the steerable wheel assembly to transmit user-selected steering inputs to the steerable wheel assembly; and
a drive assembly, comprising:
a battery-powered motor assembly adapted to drive the rotation of the driven wheel assembly to propel the vehicle along a riding surface;
at least one user input device that is positioned for actuation by a child sitting on the seat and adapted to receive a user input selecting a selected rotational input; and
an electronic speed controller adapted to regulate the rate at which the selected rotational input is transmitted to the driven wheel assembly, wherein the electronic speed controller is adapted to regulate the transmission of a first percentage of the selected rotational input to the driven wheel assembly upon receipt of the user input selecting the selected rotational input, wherein the first percentage is less than 100% of the selected rotational input, and further wherein upon transmission of the first percentage of the selected rotational input, at least a second percentage of the selected rotational input is transmitted to the driven wheel assembly.

35. The children's ride-on vehicle of claim 34, wherein the first percentage is less than 50% of the selected rotational input.

36. The children's ride-on vehicle of claim 35, wherein the first percentage is in the range of 15% and 40% of the selected rotational input.

37. The children's ride-on vehicle of claim 34, wherein the first percentage of the selected rotational input is transmitted to the driven wheel assembly, the electronic speed controller is further adapted to maintain the transmission of the first percentage for a predetermined time period and then regulate the transmission of the second percentage of the selected rotational input.

38. The children's ride-on vehicle of claim 37, wherein the second percentage is incrementally transmitted to the driven wheel assembly.

39. The children's ride-on vehicle of claim 37, wherein the second percentage is transmitted to the driven wheel assembly according to a predetermined transmission profile.

40. The children's ride-on vehicle of claim 39, wherein the predetermined transmission profile includes a linear increase in the percentage of the selected rotational input that is transmitted to the driven wheel assembly.

41. The children's ride-on vehicle of claim 39, wherein the predetermined transmission profile includes a step-wise increase in the percentage of the selected rotational input that is transmitted to the driven wheel assembly.

42. The children's ride-on vehicle of claim 39, wherein the predetermined transmission profile includes a non-linear increase in the percentage of the selected rotational input that is transmitted to the driven wheel assembly.

43. The children's ride-on vehicle of claim 34, wherein the electronic speed controller includes both hardware and software components.

44. The children's ride-on vehicle of claim 43, wherein the electronic speed controller includes a microprocessor, and further wherein the electronic speed controller is adapted to regulate the actuations of the motor assembly through microprocessor-based duty cycle ramping.

45. The children's ride-on vehicle of claim 43, wherein the electronic speed controller includes a microprocessor adapted to regulate the transmission of the selected rotational input through pulse width modulation of the actuation of the motor assembly.

46. A children's ride-on vehicle, comprising:
   a body having a seat adapted to receive a child;
   a plurality of wheels rotatably coupled to the body, wherein the plurality of wheels includes a driven wheel assembly and a steerable wheel assembly;
   a steering assembly having a steering mechanism positioned for actuation by a child sitting on the seat and operatively connected to the steerable wheel assembly to transmit user-selected steering inputs to the steerable wheel assembly; and
   a drive assembly, comprising:
      a battery-powered motor assembly adapted to drive the rotation of the driven wheel assembly to propel the vehicle along a riding surface;
      at least one user input device that is positioned for actuation by a child sitting on the seat and adapted to receive a user input selecting a selected rotational input; and
      an electronic speed controller adapted to regulate the rate at which the selected rotational input is transmitted to the driven wheel assembly, wherein the electronic speed controller includes a microprocessor and further wherein the electronic speed controller is adapted to regulate the actuations of the motor assembly through microprocessor-based duty cycle ramping.

47. The children's ride-on vehicle of claim 46, wherein the electronic speed controller is adapted to regulate the rate at which the selected rotational input is transmitted to the driven wheel assembly according to a predetermined transmission profile in which the selected rotational input is incrementally transmitted to the driven wheel assembly.

48. The children's ride-on vehicle of claim 47 wherein the predetermined transmission profile includes a linear increase in the percentage of the selected rotational input that is transmitted to the driven wheel assembly.

49. The children's ride-on vehicle of claim 47, wherein the predetermined transmission profile includes a step-wise increase in the percentage of the selected rotational input that is transmitted to the driven wheel assembly.

50. The children's ride-on vehicle of claim 47, wherein the predetermined transmission profile includes a non-linear increase in the percentage of the selected rotational input that is transmitted to the driven wheel assembly.

51. The children's ride-on vehicle of claim 46, wherein the electronic speed controller is adapted to regulate the transmission of a first percentage of the selected rotational input to the driven wheel assembly upon receipt of the user input selecting the selected rotational input, and further wherein the first percentage is less than 100% of the selected rotational input.

52. A children's ride-on vehicle, comprising:
   a body having a seat adapted to receive a child;
   a plurality of wheels rotatably coupled to the body, wherein the plurality of wheels includes a driven wheel assembly and a steerable wheel assembly;
   a steering assembly having a steering mechanism positioned for actuation by a child sitting on the seat and operatively connected to the steerable wheel assembly to transmit user-selected steering inputs to the steerable wheel assembly; and
   a drive assembly, comprising:
      a battery-powered motor assembly adapted to drive the rotation of the driven wheel assembly to propel the vehicle along a riding surface;
      at least one user input device that is positioned for actuation by a child sitting on the seat and adapted to receive a user input selecting a selected rotational input; and
      an electronic speed controller adapted to regulate the rate at which the selected rotational input is transmitted to the driven wheel assembly, wherein the electronic speed controller includes a microprocessor and further wherein the electronic speed controller is adapted to regulate the transmission of the selected rotational input through pulse width modulation of the actuation of the motor assembly.

53. The children's ride-on vehicle of claim 52, wherein the electronic speed controller is adapted to regulate the rate at which the selected rotational input is transmitted to the driven wheel assembly according to a predetermined transmission profile in which the selected rotational input is incrementally transmitted to the driven wheel assembly.

54. The children's ride-on vehicle of claim 53, wherein the predetermined transmission profile includes a linear increase in the percentage of the selected rotational input that is transmitted to the driven wheel assembly.

55. The children's ride-on vehicle of claim 53, wherein the predetermined transmission profile includes a step-wise increase in the percentage of the selected rotational input that is transmitted to the driven wheel assembly.

56. The children's ride-on vehicle of claim 53, wherein the predetermined transmission profile includes a non-linear increase in the percentage of the selected rotational input that is transmitted to the driven wheel assembly.

57. The children's ride-on vehicle of claim 52, wherein the electronic speed controller is adapted to regulate the transmission of a first percentage of the selected rotational input to the driven wheel assembly upon receipt of the user input selecting the selected rotational input, and further wherein the first percentage is less than 100% of the selected rotational input.

* * * * *